United States Patent
Wei et al.

(10) Patent No.: US 10,826,830 B2
(45) Date of Patent: Nov. 3, 2020

(54) CONGESTION PROCESSING METHOD, HOST, AND SYSTEM

(71) Applicant: HUAWEI TECHNOLOGIES CO., LTD., Shenzhen, Guangdong (CN)

(72) Inventors: Anni Wei, Shenzhen (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 16/171,568

(22) Filed: Oct. 26, 2018

(65) Prior Publication Data
US 2019/0068503 A1 Feb. 28, 2019

Related U.S. Application Data

(63) Continuation of application No. PCT/CN2016/080520, filed on Apr. 28, 2016.

(51) Int. Cl.
*H04L 12/801* (2013.01)
*H04L 12/833* (2013.01)
(Continued)

(52) U.S. Cl.
CPC .............. *H04L 47/12* (2013.01); *H04L 43/16* (2013.01); *H04L 47/11* (2013.01); *H04L 47/196* (2013.01);
(Continued)

(58) Field of Classification Search
CPC ......... H04L 47/12; H04L 43/16; H04L 47/11; H04L 47/196; H04L 47/24; H04L 47/25; H04L 47/263; H04L 47/31; H04L 47/2674
(Continued)

(56) References Cited

U.S. PATENT DOCUMENTS 6,208,619 B1 * 3/2001 Takeuchi ................ H04L 47/10
370/229
6,240,140 B1 * 5/2001 Lindbergh .............. H04L 7/10
370/329
(Continued)

FOREIGN PATENT DOCUMENTS

CN 101741747 A 6/2010
CN 102055677 A 5/2011
(Continued)

OTHER PUBLICATIONS

RFC3168, K. Ramakrishnan et al., "The Addition of Explicit Congestion Notification (ECN) to IP," Network Working Group, Sep. 2001, pp. 1-63.
(Continued)

*Primary Examiner* — Phong La
(74) *Attorney, Agent, or Firm* — Kilpatrick Townsend & Stockton LLP

(57) ABSTRACT

The present application discloses a congestion processing method. The method includes: sending, by the source host, a resource data packet on each stream based on a transmit rate of each stream, where when the router determines that the transmission link is congested, the router sets a congestion flag in the resource data packet; receiving, from each stream, a response data packet forwarded by the router, where at least one response data packet on at least one stream includes a congestion notification flag; and performing congestion processing based on the congestion notification flag and the transmission priority of each stream.

14 Claims, 6 Drawing Sheets

(51) Int. Cl.
*H04L 12/865* (2013.01)
*H04L 12/825* (2013.01)
*H04L 12/26* (2006.01)
*H04L 12/851* (2013.01)

(52) U.S. Cl.
CPC .............. *H04L 47/24* (2013.01); *H04L 47/25* (2013.01); *H04L 47/263* (2013.01); *H04L 47/31* (2013.01); *H04L 47/6275* (2013.01)

(58) Field of Classification Search
USPC ........................................................ 370/236
See application file for complete search history.

(56) References Cited

U.S. PATENT DOCUMENTS

| | | | | |
|---|---|---|---|---|
| 6,463,484 | B1* | 10/2002 | Moss ................. | H04L 47/2433 709/232 |
| 9,548,930 | B1* | 1/2017 | Hardie .................... | H04L 47/18 |
| 10,333,853 | B1* | 6/2019 | Seshadri ................. | H04L 45/50 |
| 2005/0041587 | A1* | 2/2005 | Lee ......................... | H04L 45/00 370/236 |
| 2006/0203730 | A1* | 9/2006 | Zur ......................... | H04L 47/10 370/235 |
| 2010/0246400 | A1* | 9/2010 | Onishi .................... | H04L 47/10 370/235 |
| 2011/0032819 | A1* | 2/2011 | Schliwa-Bertling .... | H04L 47/10 370/229 |
| 2012/0195201 | A1* | 8/2012 | Ishikawa ............. | H04L 41/0896 370/235.1 |
| 2013/0155938 | A1* | 6/2013 | Smith .................. | H04L 69/163 370/315 |
| 2014/0016461 | A1* | 1/2014 | Ishikawa ................. | H04L 47/17 370/230 |
| 2014/0043977 | A1* | 2/2014 | Wiley ............... | H04L 29/06027 370/235 |
| 2014/0112128 | A1* | 4/2014 | Kwan .................... | H04L 47/26 370/230 |
| 2014/0164640 | A1* | 6/2014 | Ye .......................... | H04L 47/12 709/235 |
| 2014/0233390 | A1* | 8/2014 | Schmid ................. | H04L 47/125 370/236 |
| 2015/0074285 | A1 | 3/2015 | Gahm et al. | |
| 2015/0138970 | A1* | 5/2015 | Tabatabaee ............. | H04L 47/11 370/230 |

FOREIGN PATENT DOCUMENTS

CN 104836743 A 8/2015
CN 105531968 A 4/2016

OTHER PUBLICATIONS

RFC2481, K. Ramakrishnan et al., "A Proposal to add Explicit Congestion Notification (ECN) to IP," Network Working Group, Jan. 1999, pp. 1-25.
RFC2474, K. Nichols et al., "Definition of the Differentiated Services Field (DS Field) in the IPv4 and IPv6 Headers," Network Working Group, Dec. 1998, pp. 1-20.
RFC791, "Internet Protocol Darpa Internet Program Protocol Specification," Sep. 1981, (50 pp.).
International Search Report, dated Dec. 30, 2016, in International Application No. PCT/CN2016/080520 (4 pp.).
Witten Opinion of the International Searching Authority, dated Dec. 30, 2016, in International Application No. PCT/CN2016/080520 (7 pp.).
Extended European Search Report, dated Feb. 5, 2019, in European Application No. 16899820.1 (8 pp.).

* cited by examiner

| Currently unused bit (currently unused) | Value of a sequence number | Value of a connection flag | Public reset packet | QUIC version |
|---|---|---|---|---|
| Explicit congestion notification field (ECN FIELD) | | | | |

FIG. 5

| Currently unused bit (currently unused) | | Value of a sequence number | Value of a connection flag | Public reset packet | QUIC version |
|---|---|---|---|---|---|
| Congestion processing bit | Congestion notification flag (ECN) | | | | |

FIG. 6

| Currently unused bit (currently unused) | | Value of a sequence number | Value of a connection flag | Public reset packet | QUIC version |
|---|---|---|---|---|---|
| Flag indicating that congestion is already processed (CWR) | Congestion notification bit | | | | |

FIG. 7

CONGESTION PROCESSING METHOD, HOST, AND SYSTEM

CROSS-REFERENCE TO RELATED APPLICATIONS

This application is a continuation of International Application No. PCT/CN2016/080520 filed on Apr. 28, 2016, the disclosure of which is hereby incorporated by reference in its entirety.

TECHNICAL FIELD

The present application relates to the field of communications technologies, and specifically to a congestion processing method, a host, and a system.

BACKGROUND

The user datagram protocol (UDP) is a connectionless transport layer protocol. The quick user datagram protocol internet connection (QUIC) is a transport protocol based on the UDP and is used to implement multiplexing and security protection.

Due to limited network resources, congestion often occurs in UDP-based QUIC data packet transmission.

In the prior art, for the congestion of the UDP-based QUIC data packet transmission, there is no corresponding congestion processing solution in the prior art.

SUMMARY

To resolve a problem of congestion of UDP-based QUIC data packet transmission in the prior art, embodiments of the present application provide a congestion processing method, so that congestion processing can be performed based on a transmission priority of a stream, thereby relieving congestion of a transmission link and improving data transmission efficiency. The embodiments of the present application further provide a corresponding host and a corresponding system.

A first aspect of the present application provides a congestion processing method. The method relates to a data transmission system. The data transmission system includes a source host, a router, and a destination host, a transmission link among the source host, the router, and the destination host bears a plurality of streams, and a transmission priority is configured for each of the plurality of streams. There may be a plurality of routers between the source host and the destination host, one source host may also correspond to a plurality of destination hosts, and one destination host may also correspond to a plurality of source hosts. The congestion processing method includes: sending, by the source host, a resource data packet on each stream based on a transmit rate of each stream, where when the router determines that the transmission link is congested, the router sets a congestion flag in the resource data packet; receiving, by the source host from each stream, a response data packet forwarded by the router, where the response data packet is sent by the destination host, at least one response data packet on at least one stream includes a congestion notification flag, and the congestion notification flag is used to notify the source host that the transmission link has already been congested; and performing, by the source host, congestion processing based on the congestion notification flag and the transmission priority of each stream, and adding a flag indicating that congestion has already been processed to a to-be-sent resource data packet, where the flag indicating that congestion has already been processed is used to notify the destination host that the congestion of the transmission link has already been processed. It can be learned from the descriptions of the first aspect that congestion processing can be performed for a QUIC data packet. In this way, the congestion of the transmission link is relieved and data transmission efficiency is improved; and in addition, the congestion processing is performed based on the transmission priority of the stream, thereby further ensuring data transmission on a stream with a high priority and ensuring experience of an important user.

With reference to the first aspect, in a first possible implementation, the performing congestion processing based on the transmission priority of each stream includes: decreasing, based on the transmission priority of each stream, a transmit rate of each stream whose transmission priority is lower than a preset threshold. It can be learned from the first possible implementation of the first aspect that a transmit rate of a stream with a relatively low transmission priority is decreased, so that the congestion can be resolved and sending of a data packet on a stream with a high transmission priority can be ensured, thereby ensuring user experience.

With reference to the first aspect, in a second possible implementation, the performing congestion processing based on the transmission priority of each stream includes: decreasing, based on the transmission priorities of the streams, the transmit rates of the streams respectively by stepwise increasing amounts in descending order of the transmission priorities, where an amount by which a rate of a stream with a high transmission priority is decreased is less than an amount by which a rate of a stream with a low transmission priority is decreased. It can be learned from the second possible implementation of the first aspect that the rate of the stream with a high transmission priority is decreased by a small amount and the transmit rate of the stream with a low transmission priority is decreased by a large amount, so that the congestion can be resolved and sending of a data packet on the stream with a high transmission priority can be ensured, thereby ensuring user experience.

With reference to the first aspect, in a third possible implementation, the performing congestion processing based on the transmission priority of each stream includes: when a quantity of received congestion notifications that are sent by the destination host does not reach a preset threshold, decreasing the transmit rates of the streams in a progressive manner; or when a quantity of received congestion notifications that are sent by the destination host reaches the preset threshold, decreasing the transmit rates of the streams in a stepwise manner. It can be learned from the third possible implementation of the first aspect that when the quantity of received congestion notifications is relatively small, the transmit rates of the streams may be decreased in the progressive manner. If the congestion can be relieved by decreasing the transmit rate by a small amount, sending of the data packet is not severely affected. If the quantity of received congestion notifications reaches the preset threshold, it indicates that the congestion is relatively severe and the congestion needs to be resolved as soon as possible, so that the transmit rate of the stream needs to be decreased by a large amount.

With reference to the first aspect or any one of the first to the third possible implementations of the first aspect, the adding, by the source host, a flag indicating that congestion has already been processed to a to-be-sent resource data packet includes: adding, by the source host, the flag indicating that congestion has already been processed to an idle bit in a header of the to-be-sent resource data packet. It can be learned from the fourth possible implementation of the first aspect that the congestion flag is added to the idle bit, so that utilization of an existing resource in the resource data packet can be improved.

A second aspect of the present application provides a congestion processing method. The method relates to a data transmission system. The data transmission system includes a source host, a router, and a destination host, a transmission link among the source host, the router, and the destination host bears a plurality of streams, and a transmission priority is configured for each of the plurality of streams. The method includes: receiving, by the destination host from each stream, a resource data packet forwarded by the router, where the resource data packet is sent by the source host, and when the router determines that the transmission link is congested, the router sets a congestion flag in the resource data packet; setting, by the destination host based on the congestion flag, a congestion notification flag in at least one to-be-sent response data packet corresponding to at least one stream, and sending, on the at least one stream, the response data packet in which the congestion notification flag has already been set, where the congestion notification flag is used to indicate to the source host that the transmission link has already been congested; and when receiving a resource data packet including a flag indicating that congestion has already been processed, stopping, by the destination host, setting a congestion notification flag in a to-be-sent response data packet. It can be learned from the descriptions of the second aspect that congestion processing can be performed for a QUIC data packet. In this way, the congestion of the transmission link is relieved and data transmission efficiency is improved; and in addition, the congestion processing is performed based on the transmission priority of the stream, thereby further ensuring data transmission on a stream with a high priority and ensuring experience of an important user.

With reference to the second aspect, in a first possible implementation, the setting a congestion notification flag in at least one to-be-sent response data packet corresponding to at least one stream includes: setting the congestion notification flag at a congestion notification flag bit of the at least one to-be-sent response data packet corresponding to the at least one stream, where the congestion notification flag bit is an idle bit in a header of the to-be-sent response data packet; and correspondingly, the flag indicating that congestion has already been processed is located at an idle bit in a header of the resource data packet including the flag indicating that congestion has already been processed. It can be learned from the first possible implementation of the second aspect that the congestion flag or the flag indicating that congestion has already been processed is added to the idle bit, so that utilization of an existing resource in the resource data packet can be improved.

With reference to the second aspect, in a second possible implementation, the at least one to-be-sent response data packet corresponding to the at least one stream includes a congestion notification frame, and the congestion notification frame includes the congestion notification flag; and correspondingly, the flag indicating that congestion has already been processed is located at an idle bit in a header of the resource data packet including the flag indicating that congestion has already been processed; or the resource data packet including the flag indicating that congestion has already been processed includes a frame indicating that congestion has already been processed, and the frame indicating that congestion has already been processed includes the flag indicating that congestion has already been processed. It can be learned from the second possible implementation of the second aspect that the congestion is notified by using the congestion notification frame, so that a congestion notification form is added.

With reference to the second aspect or the first or the second possible implementation of the second aspect, the setting a congestion notification flag in at least one to-be-sent response data packet corresponding to at least one stream, and sending, on the at least one stream, the response data packet in which the congestion notification flag has already been set includes: setting, by the destination host, the congestion notification flag in the to-be-sent response data packet corresponding to a stream whose transmission priority is the highest, and sending, on the stream whose transmission priority is the highest, the response data packet in which the congestion notification flag has already been set. It can be learned from the third possible implementation of the second aspect that the response data packet including the congestion notification flag is sent by using the stream whose transmission priority is the highest, so that the source host can rapidly receive the congestion notification flag, thereby increasing a congestion processing speed.

A third aspect of the present application provides a host. The host is configured to implement a function of the method according to the first aspect or any optional implementation of the first aspect. The host is implemented by using hardware/software, and the hardware/software includes a unit corresponding to the foregoing function.

A fourth aspect of the present application provides a host. The host is configured to implement a function of the method according to the second aspect or any optional implementation of the second aspect. The host is implemented by using hardware/software, and the hardware/software includes a unit corresponding to the foregoing function.

A fifth aspect of the present application provides a computer storage medium. The computer storage medium stores a congestion processing program according to the first aspect or any optional implementation of the first aspect.

A sixth aspect of the present application provides a computer storage medium. The computer storage medium stores a congestion processing program according to the second aspect or any optional implementation of the second aspect.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person skilled in the art may still derive other drawings from these accompanying drawings without creative efforts.

FIG. 5 is a schematic diagram of a principle that an idle bit in a header of a QUIC data packet supports ECN capability negotiation according to an embodiment of the present application;

FIG. 6 is a schematic diagram of a data structure including a congestion notification flag according to an embodiment of the present application;

FIG. 7 is a schematic diagram of a data structure including a flag indicating that congestion has already been processed according to an embodiment of the present application;

DESCRIPTION OF EMBODIMENTS

Embodiments of the present application provide a congestion processing method, so that congestion processing can be performed based on a transmission priority of a stream, thereby relieving congestion of a transmission link and improving data transmission efficiency. The embodiments of the present application further provide a corresponding host and a corresponding system. Detailed descriptions are separately provided below.

The following clearly and completely describes the technical solutions in the embodiments of the present application with reference to the accompanying drawings in the embodiments of the present application. Apparently, the described embodiments are merely some but not all of the embodiments of the present application. All other embodiments obtained by a person skilled in the art based on the embodiments of the present application without creative efforts shall fall within the protection scope of the present application.

Figure 1:
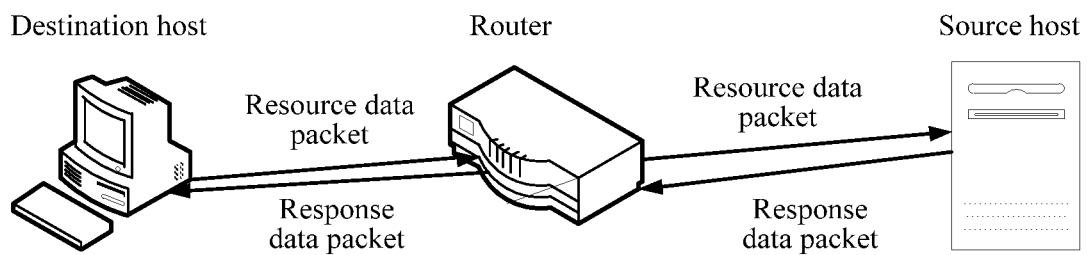
FIG. 1 is a schematic diagram of an embodiment of a data transmission system according to the embodiments of the present application.

FIG. 1 is a simplified schematic diagram of an embodiment of a data transmission system according to the embodiments of the present application.

As shown in FIG. 1, the data transmission system provided in this embodiment of the present application includes a source host, a router, and a destination host. The source host and the destination host may each be user equipment or may each be a server. In FIG. 1, an example in which the source host is a server and the destination host is user equipment is used for description. Actually, communications devices such as a base station and a gateway may further be included between the destination host and the router. Functions of the base station and the gateway in this embodiment of the present application are the same as those in the prior art. Therefore, the base station and the gateway are not shown in FIG. 1. In addition, a quantity of routers is not limited to one in FIG. 1. Actually, there may be a plurality of routers. Functions and principles of the routers are basically the same. Therefore, an example in which there is one router is merely used for description in this application, and should not be construed as a limitation to the quantity of routers. In addition, one source host may also correspond to a plurality of destination hosts, and one destination host may also correspond to a plurality of source hosts. In this embodiment of this application, an example of one source host and one destination host shown in FIG. 1 is used for description.

A transmission link among the source host, the router, and the destination host shown in FIG. 1 bears a plurality of streams, and a transmission priority is configured for each of the plurality of streams. The transmission link is a transmission link among the source host, the router, and the destination host.

It should be noted that the stream in this embodiment of the present application may be unrelated to directivity, but is related to a resource object. For example, user equipment accesses an image on a server by using a browser client. A request data packet sent by the client to the server and a resource data packet replied by the server to the client belong to a same stream.

It may be considered that replies to one data object may belong to one stream. A data object may be an image, a video, or a text. A plurality of streams may be transmitted in parallel on a QUIC connection, and priorities of the streams may be different.

A request data packet sent by the user equipment, a resource data packet sent by the server, and a response data packet sent after the user equipment receives the resource data packet may be transmitted on one stream. The data packets mentioned in this application are QUIC data packets.

The transmit rates of the streams may be the same or may be different. The transmit rate of the stream is a transmit rate of a data packet on the stream. If the transmit rate is high, a quantity of data packets that are sent within a same time length is large, or if the transmit rate is low, a quantity of data packets that are sent within a same time length is small.

Figure 2:
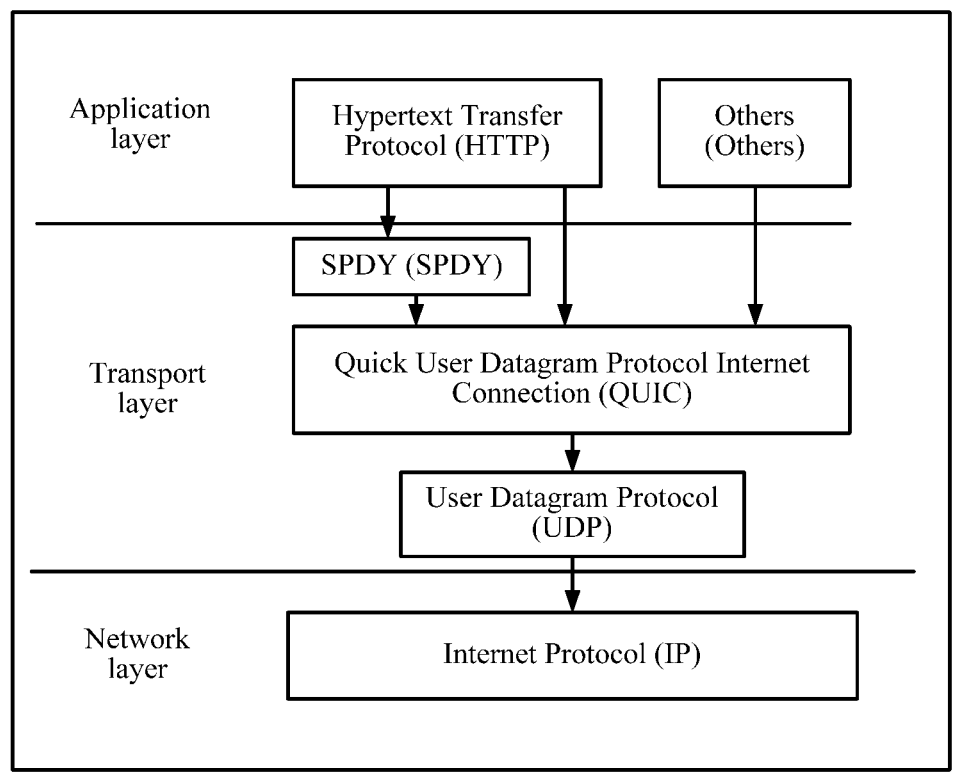
FIG. 2 is a schematic diagram of a QUIC protocol stack according to an embodiment of the present application.

This embodiment of the present application is applicable to congestion processing for quick user datagram protocol internet connection (QUIC) data transmission. The QUIC is a transport protocol based on the User Datagram Protocol (UDP) and is used to implement multiplexing and security protection. FIG. 2 is a schematic diagram of a communication protocol stack according to an embodiment of the present application. As shown in FIG. 2, a communication protocol stack includes an application layer, a transport layer, and a network layer. The UDP is located at the transport layer. The QUIC is based on the UDP and is between the transport layer and the application layer.

Figure 3:
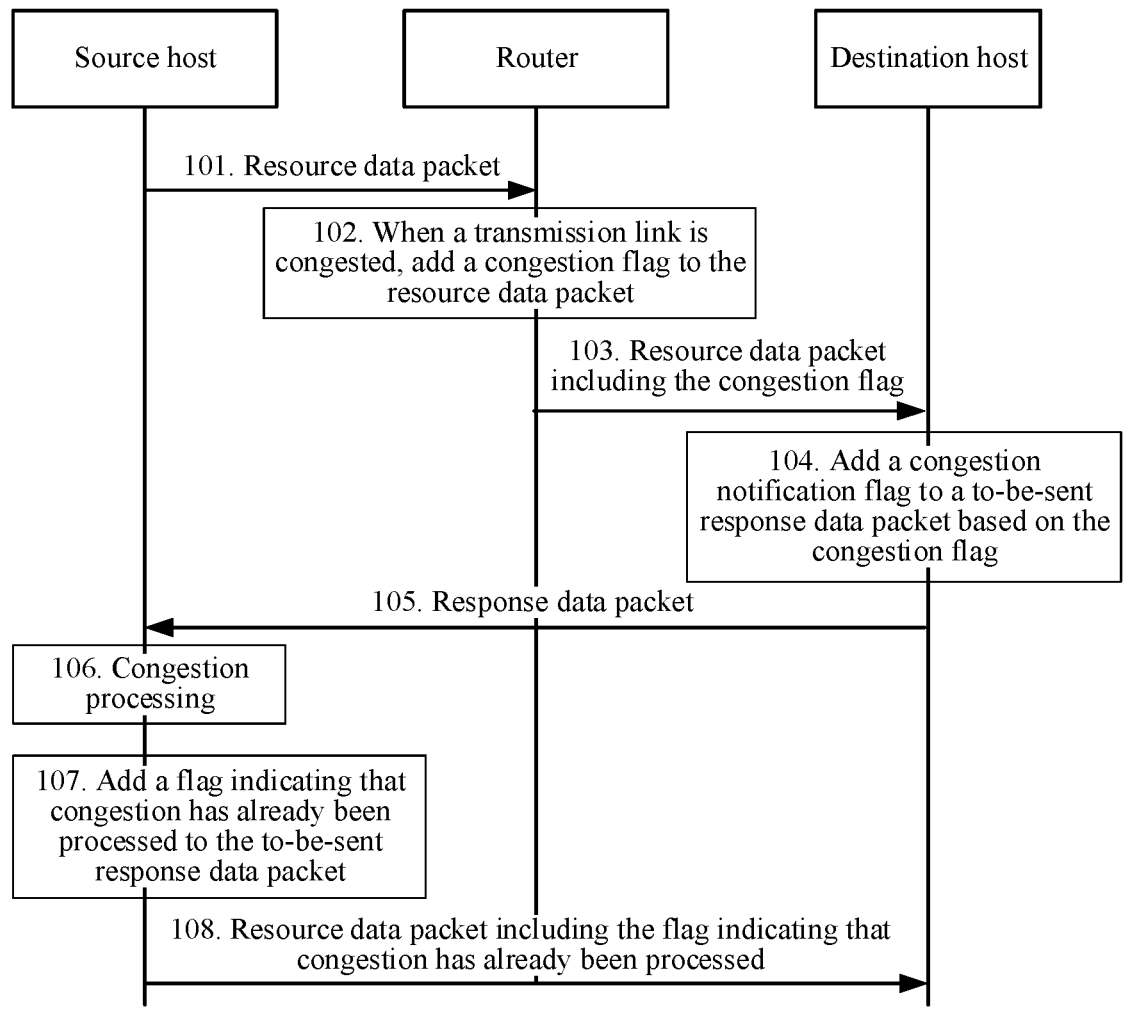
FIG. 3 is a schematic diagram of an embodiment of a congestion processing method according to the embodiments of the present application.

A process of processing link congestion occurring in a data transmission system is described below with reference to the data transmission system described in FIG. 1 and a congestion processing process shown in FIG. 3.

101. The source host sends a resource data packet on each stream based on a transmit rate of each stream.

102. After receiving the resource data packet from each stream, if determining that the transmission link is congested, the router sets a congestion flag in the resource data packet, to obtain the resource data packet including the congestion flag.

If determining that the transmission link is not congested, the router normally forwards the resource data packet.

103. The router sends the resource data packet including the congestion flag again.

If there is another router after the router in the transmission link, the subsequent another router does not modify the resource data packet including the congestion flag any more.

104. After receiving the resource data packet including the congestion flag, the destination host learns, based on the congestion flag in the resource data packet including the congestion flag, that the transmission link is congested, and sets a congestion notification flag in a to-be-sent response data packet.

If all the resource data packets of a plurality of streams that are received by the destination host include congestion flags, it may be determined that at least one of the plurality of streams is used to transmit the congestion notification flag. In this way, the congestion notification flag needs to be added to only a response data packet of the at least one determined stream. For example, a stream whose transmission priority is the highest may be selected to transmit the congestion notification flag, so that the source host can more rapidly learn that the transmission link is congested.

The destination host may set the congestion notification flag in at least one to-be-sent response data packet corresponding to at least one stream.

105. The destination host sends the response data packet including the congestion notification flag.

106. After receiving the response data packet including the congestion notification flag, the source host learns that the transmission link is congested and performs congestion processing.

The congestion may be processed by reducing a quantity of sent resource data packets.

107. The source host adds a flag indicating that congestion has already been processed to a to-be-sent resource data packet, where the flag indicating that congestion has already been processed is used to notify the destination host that the congestion of the transmission link has already been processed.

The source host may add the flag indicating that congestion has already been processed to an idle bit in a header of the to-be-sent resource data packet.

108. The source host sends the resource data packet including the flag indicating that congestion has already been processed.

After receiving the resource data packet including the flag indicating that congestion has already been processed, the destination host learns, based on the flag indicating that congestion has already been processed, that the congestion of the transmission link has already been processed, so that no congestion notification flag is set in a subsequently sent response data packet any more.

According to the congestion processing method provided in this embodiment of the present application, congestion processing can be performed for a QUIC data packet. In this way, the congestion of the transmission link is relieved and data transmission efficiency is improved; and in addition, in this embodiment of the present application, the congestion processing is performed based on the transmission priority of the stream, thereby further ensuring data transmission on a stream with a high priority and ensuring experience of an important user.

Actually, before transmitting a QUIC data packet, the source host, the router, and the destination host perform ECN capability negotiation, and after determining that each of the source host, the router, and the destination host supports an explicit congestion notification (ECN), the source host, the router, and the destination host perform the congestion processing process described above.

The ECN capability negotiation may be implemented in a plurality of manners. For example, in a QUIC handshake phase, an idle bit in a header of the QUIC data packet is used for the ECN capability negotiation. For example, if the first two bits of public flags Public Flags in the header are in an idle state, the first two bits of the Public Flags may be used. Alternatively, tags carried in Client hello and Server hello in the QUIC handshake phase may be extended. An ECN Tag and an ECN Tag value are added.

Figure 4:
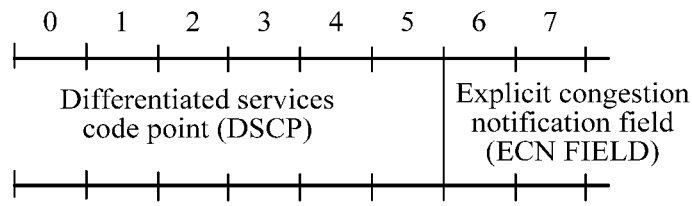
FIG. 4 is a schematic diagram of a principle that an IP header field supports ECN capability negotiation according to an embodiment of the present application.

FIG. 4 is a schematic diagram of a principle that an IP header field supports ECN capability negotiation according to an embodiment of the present application.

As shown in FIG. 4, an IP header field includes eight bits, a differentiated services code point (DSCP) occupies six bits, and remaining two idle bits may be used as an ECN FIELD for ECN capability negotiation. When the two bits of the ECN FIELD are both 00, it indicates that a host that sends a data packet does not support an ECN. When the two bits are 01 or 10, it indicates that a host that sends a data packet supports the ECN. When the two bits are 11, it indicates that a transmission link is congested.

FIG. 5 is a schematic diagram of a principle that idle bits of Public Flags in a header of a QUIC data packet supports ECN capability negotiation in a handshake phase according to an embodiment of the present application.

As shown in FIG. 5, Public Flags include two idle bits, and the two idle bits may be used as an ECN FIELD for ECN capability negotiation. When the two bits of the ECN FIELD are both 00, it indicates that a host that sends a data packet does not support an ECN. When the two bits are 01 or 10, it indicates that a host that sends a data packet supports the ECN. When the two bits are 11, it indicates that a transmission link is congested.

In addition, in a handshake phase, a tag may be extended to support ECN capability negotiation.

ECN Tag value: 1 indicates that an ECN capability is supported, and 0 indicates that the ECN capability is not supported.

In the embodiments of the present application, in step 102, the setting, by the router, a congestion flag in the resource data packet may be setting two bits of the ECN FIELD in the resource data packet to 11, to obtain the resource data packet including the congestion flag.

In step 104, after receiving the resource data packet including the congestion flag, the destination host reads 11 from the bits of the ECN FIELD, so that the destination host learns that the transmission link is congested, and sets the congestion notification flag in the to-be-sent response data packet. As shown in FIG. 6, the congestion notification flag may be set at a congestion notification flag bit of the ECN FIELD. For example, an ECN-Echo is used as the congestion notification flag, so that the ECN-Echo is set at the congestion notification flag bit of the ECN FIELD.

In step 106, after receiving the response data packet including the congestion notification flag and reading the ECN-Echo, the source host learns that the transmission link is congested, and processes the congestion. A congestion processing method may be decreasing the transmit rate of the stream.

A specific method for processing congestion based on the transmission priority of each stream may include the following three solutions:

Solution 1: A transmit rate of each stream whose transmission priority is lower than a preset threshold is decreased based on the transmission priority of each stream.

In Solution 1, a transmit rate of a stream with a relatively low transmission priority is decreased, so that the congestion is resolved and sending of the data packet on a stream with a high transmission priority can be ensured, thereby ensuring user experience.

Solution 2: The transmit rates of the streams are respectively decreased based on the transmission priorities of the streams by stepwise increasing amounts in descending order of the transmission priorities. An amount by which a rate of a stream with a high transmission priority is decreased is less than an amount by which a rate of a stream with a low transmission priority is decreased.

In Solution 2, the rate of the stream with a high transmission priority is decreased by a small amount and the transmit rate of the stream with a low transmission priority is decreased by a large amount, so that the congestion can be resolved and sending of the data packet on the stream with a high transmission priority can be ensured, thereby ensuring user experience.

Solution 3: When a quantity of received congestion notifications that are sent by the destination host does not reach a preset threshold, the transmit rates of the streams are decreased in a progressive manner; or when a quantity of received congestion notifications that are sent by the destination host reaches the preset threshold, the transmit rates of the streams are decreased in a stepwise manner.

In Solution 3, when the quantity of received congestion notifications is relatively small, the transmit rates of the streams may be decreased in the progressive manner. If the congestion can be relieved by decreasing the transmit rate by a small amount, sending of the data packet is not severely affected. If the quantity of received congestion notifications reaches the preset threshold, it indicates that the congestion is relatively severe and the congestion needs to be resolved as soon as possible, so that the transmit rate of the stream needs to be decreased by a large amount.

The foregoing three solutions may alternatively be used in a combined manner.

In step 107, after processing the congestion, the source host sets the flag indicating that congestion has already been processed in the to-be-sent response data packet corresponding to the at least one stream. The flag indicating that congestion has already been processed is shown in FIG. 7, and the flag indicating that congestion has already been processed may be set at a flag bit indicating that congestion has already been processed. The flag indicating that congestion has already been processed may be represented by using CWR. After receiving the resource data packet including the flag indicating that congestion has already been processed, the destination host reads CWR and learns that the source host already processes the congestion. No congestion notification flag shown in FIG. 6 is set in a subsequently sent response data packet any more.

The setting a congestion notification flag in a to-be-sent response data packet corresponding to at least one stream and sending the response data packet including the congestion notification flag includes the following three solutions:

Solution 1: The congestion notification flag is set at a congestion notification flag bit of the at least one to-be-sent response data packet corresponding to the at least one stream. The congestion notification flag bit is an idle bit in a header of the to-be-sent response data packet.

Correspondingly, the flag indicating that congestion has already been processed is located at an idle bit in a header of the resource data packet including the flag indicating that congestion has already been processed.

Solution 2: The at least one to-be-sent response data packet corresponding to the at least one stream includes a congestion notification frame, and the congestion notification frame includes the congestion notification flag.

Correspondingly, the flag indicating that congestion has already been processed is located at an idle bit in a header of the resource data packet including the flag indicating that congestion has already been processed; or the resource data packet including the flag indicating that congestion has already been processed includes a frame indicating that congestion has already been processed, and the frame indicating that congestion has already been processed includes the flag indicating that congestion has already been processed.

Solution 3: The congestion notification flag is set in the at least one to-be-sent response data packet corresponding to a stream whose transmission priority is the highest, and the response data packet in which the congestion notification flag has already been set is sent on the stream whose transmission priority is the highest.

In solution 3, the response data packet including the congestion notification flag is sent by using the stream whose transmission priority is the highest, so that the source host rapidly receives the congestion notification flag, thereby increasing a congestion processing speed.

Actually, in step 105, the destination host may alternatively notify, by using the congestion notification frame, the source host that the transmission link is congested.

Figure 8:
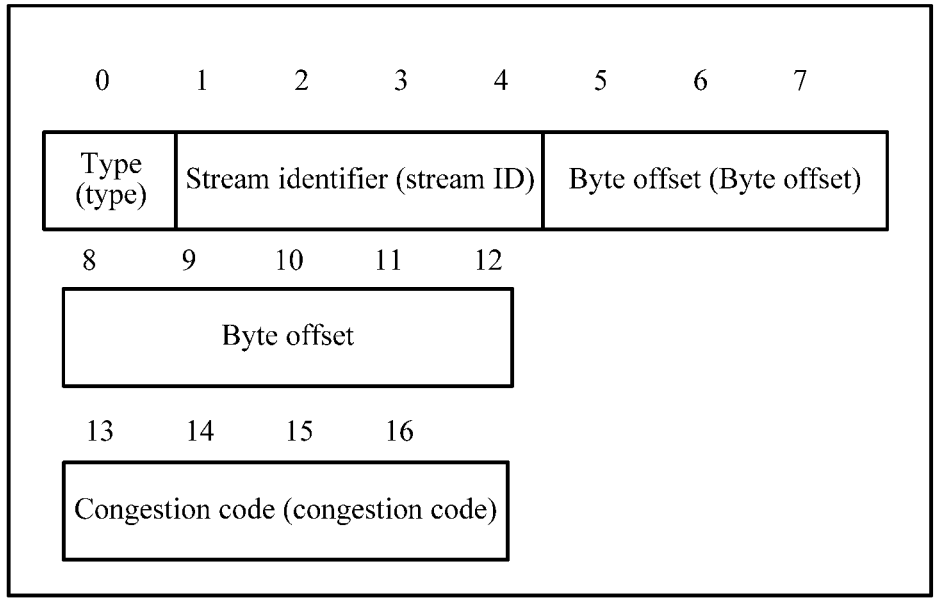
FIG. 8 is a schematic diagram of a data structure of a congestion notification frame according to an embodiment of the present application.
Figure 9:
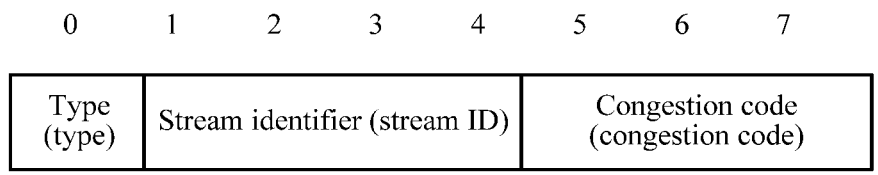
FIG. 9 is a schematic diagram of another data structure of a congestion notification frame according to an embodiment of the present application.
Figure 10:
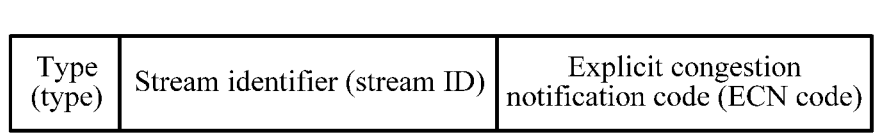
FIG. 10 is a schematic diagram of another data structure of a congestion notification frame according to an embodiment of the present application.

The congestion notification frame may include several forms in FIG. 8 to FIG. 10.

As shown in FIG. 8, FIG. 8 is an extension of a WINDOW_UPDATE frame.

$13^{th}$ to $16^{th}$ bits in an existing WINDOW_UPDATE frame are extended as congestion code bits. A congestion code in the extended WINDOW_UPDATE frame may be used to identify a congestion notification. When receiving a data packet including the congestion code, the source host performs congestion processing.

Similarly, forms of the congestion notification frame may further be forms shown in FIG. 9 and FIG. 10. The congestion notification frame may exist as an independent congestion notification frame without depending on an extension of an existing frame. As shown in FIG. 9, $5^{th}$ to $7^{th}$ bits are congestion code bits. As shown in FIG. 10, $5^{th}$ to $7^{th}$ bits are explicit congestion notification (ECN) bits.

The destination host may further create a stream specially used for notifying congestion and a priority of the stream may be set to be relatively high, to ensure that the congestion can be rapidly notified to the source host. The stream is used to transmit the congestion notification frame shown in FIG. 8 to FIG. 10.

After receiving the congestion notification frame, the source host preferentially decreases, based on the priorities of the data streams, the transmit rate of the stream with a low priority. When congestion notifications sent by a plurality of destination hosts are received and a quantity of the notifications does not reach the threshold, the transmit rates of the data streams may be decreased in the progressive manner. If the quantity of the notifications reaches the threshold, congestion windows are adjusted in a stepwise manner. For example, a quantity of the congestion windows is reduced by half.

Figure 11:
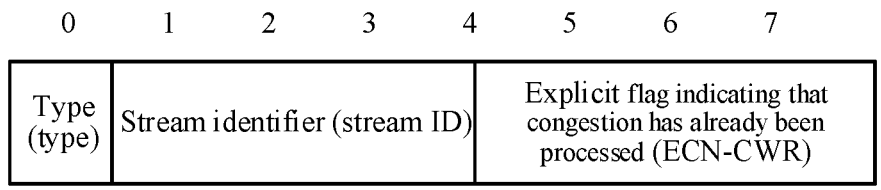
FIG. 11 is a schematic diagram of a data structure of a notification frame indicating that congestion has already been processed according to an embodiment of the present application.

After processing the congestion, the source host sends the resource data packet including the flag indicating that congestion has already been processed, to notify the destination host that the congestion has already been processed. A manner of notifying that the congestion has already been processed may be a manner corresponding to FIG. 7 or may be a dedicated notification frame indicating that congestion has already been processed shown in FIG. 11.

Figure 12:
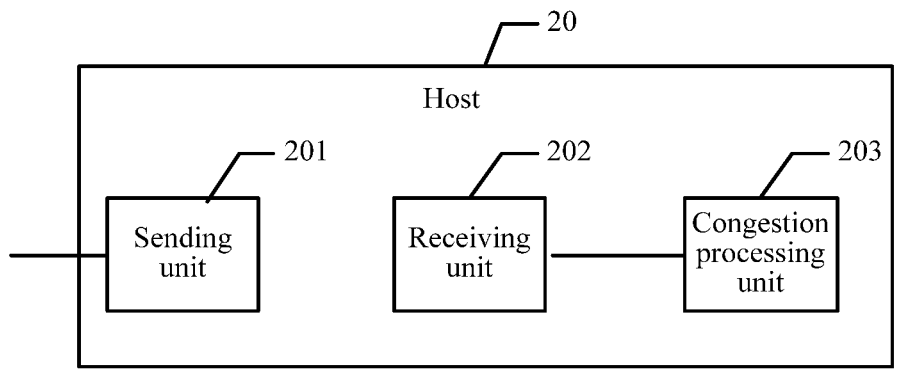
FIG. 12 is a schematic diagram of an embodiment of a host according to the embodiments of the present application.

Referring to FIG. 12, a host 20 according to an embodiment of the present application is a source host in a data transmission system, the data transmission system further includes a router and a destination host, a transmission link among the source host, the router, and the destination host bears a plurality of streams, and a transmission priority is configured for each of the plurality of streams. An embodiment of the host 20 includes:

a sending unit 201, configured to send a resource data packet on each stream based on a transmit rate of each stream, where when the router determines that the transmission link is congested, the router sets a congestion flag in the resource data packet;

a receiving unit 202, configured to receive, from each stream, each response data packet forwarded by the router, where the response data packet is sent by the destination host, at least one response data packet on at least one stream includes a congestion notification flag, and the congestion notification flag is used to notify the source host that the transmission link has already been congested; and a congestion processing unit 203, configured to: perform congestion processing based on the congestion notification flag received by the receiving unit 202 and the transmission priority of each stream, and add a flag indicating that congestion has already been processed to a to-be-sent resource data packet, where the flag indicating that congestion has already been processed is used to notify the destination host that the congestion of the transmission link has already been processed.

According to the source host provided in this embodiment of the present application, congestion processing can be performed for a QUIC data packet. In this way, the congestion of the transmission link is relieved and data transmission efficiency is improved; and in addition, in this embodiment of the present application, the congestion processing is performed based on the transmission priority of the stream, thereby further ensuring data transmission on a stream with a high priority and ensuring experience of an important user.

Optionally, the congestion processing unit 203 is specifically configured to decrease, based on the transmission priority of each stream, a transmit rate of each stream whose transmission priority is lower than a preset threshold.

Optionally, the congestion processing unit 203 is specifically configured to decrease, based on the transmission priorities of the streams, the transmit rates of the streams respectively by stepwise increasing amounts in descending order of the transmission priorities, where an amount by which a rate of a stream with a high transmission priority is decreased is less than an amount by which a rate of a stream with a low transmission priority is decreased.

Optionally, the congestion processing unit 203 is specifically configured to: when a quantity of received congestion notifications that are sent by the destination host does not reach a preset threshold, decrease the transmit rates of the streams in a progressive manner; or when a quantity of received congestion notifications that are sent by the destination host reaches the preset threshold, decrease the transmit rates of the streams in a stepwise manner.

Optionally, the congestion processing unit 203 is specifically configured to add the flag indicating that congestion has already been processed to an idle bit in a header of the to-be-sent resource data packet.

For understanding of content about the host 20, refer to the steps performed by the source host in FIG. 1 to FIG. 11, and excessive details are not described herein.

Figure 13:
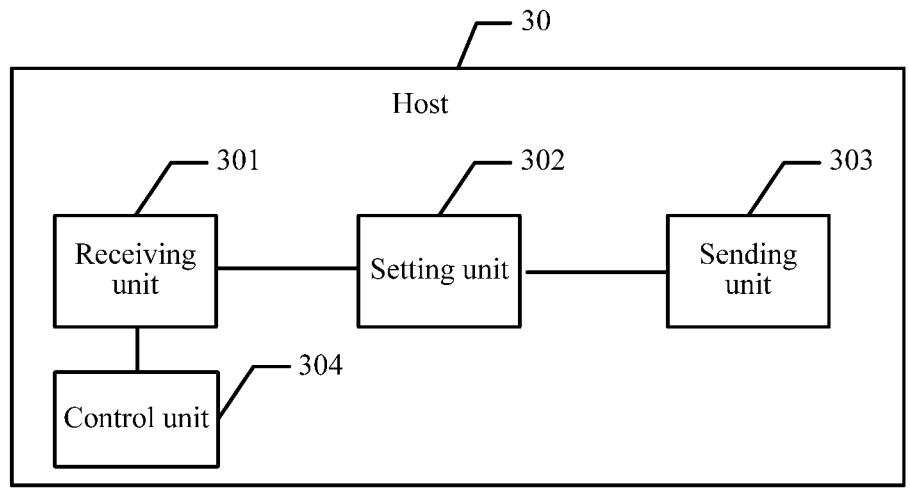
FIG. 13 is a schematic diagram of another embodiment of a host according to the embodiments of the present application.

Referring to FIG. 13, a host 30 according to an embodiment of the present application is a destination host in a data transmission system, the data transmission system further includes a source host and a router, a transmission link among the source host, the router, and the destination host bears a plurality of streams, and a transmission priority is configured for each of the plurality of streams; and the destination host 30 includes:

a receiving unit 301, configured to receive, from each stream, a resource data packet forwarded by the router, where the resource data packet is sent by the source host, and when the router determines that the transmission link is congested, the router sets a congestion flag in the resource data packet;

a setting unit 302, configured to set, based on the congestion flag received by the receiving unit 301, a congestion notification flag in at least one to-be-sent response data packet corresponding to at least one stream;

a sending unit 303, configured to send, on the at least one stream, the response data packet in which the congestion notification flag has already been set by the setting unit 302, where the congestion notification flag is used to indicate to the source host that the transmission link has already been congested; and a control unit 304, configured to: when the receiving unit 301 receives a resource data packet including a flag indicating that congestion has already been processed, stop setting a congestion notification flag in a to-be-sent response data packet.

According to the destination host provided in this embodiment of the present application, congestion processing can be performed for a QUIC data packet. In this way, the congestion of the transmission link is relieved and data transmission efficiency is improved; and in addition, in this embodiment of the present application, the congestion processing is performed based on the transmission priority of the stream, thereby further ensuring data transmission on a stream with a high priority and ensuring experience of an important user.

Optionally, the setting unit 302 is specifically configured to set the congestion notification flag at a congestion notification flag bit of the at least one to-be-sent response data packet corresponding to the at least one stream, where the congestion notification flag bit is an idle bit in a header of the to-be-sent response data packet; and the flag indicating that congestion has already been processed is located at an idle bit in a header of the resource data packet including the flag indicating that congestion has already been processed.

Optionally, the at least one to-be-sent response data packet corresponding to the at least one stream includes a congestion notification frame, and the congestion notification frame includes the congestion notification flag; and the flag indicating that congestion has already been processed is located at an idle bit in a header of the resource data packet including the flag indicating that congestion has already been processed; or the resource data packet including the flag indicating that congestion has already been processed includes a frame indicating that congestion has already been processed, and the frame indicating that congestion has already been processed includes the flag indicating that congestion has already been processed.

Optionally, the setting unit 302 is specifically configured to set the congestion notification flag in the to-be-sent response data packet corresponding to a stream whose transmission priority is the highest; and the sending unit 303 is specifically configured to send, on the stream whose transmission priority is the highest, the response data packet in which the congestion notification flag has already been set.

For understanding of content about the host 30, refer to the steps performed by the destination host in FIG. 1 to FIG. 11, and excessive details are not described herein.

Figure 14:
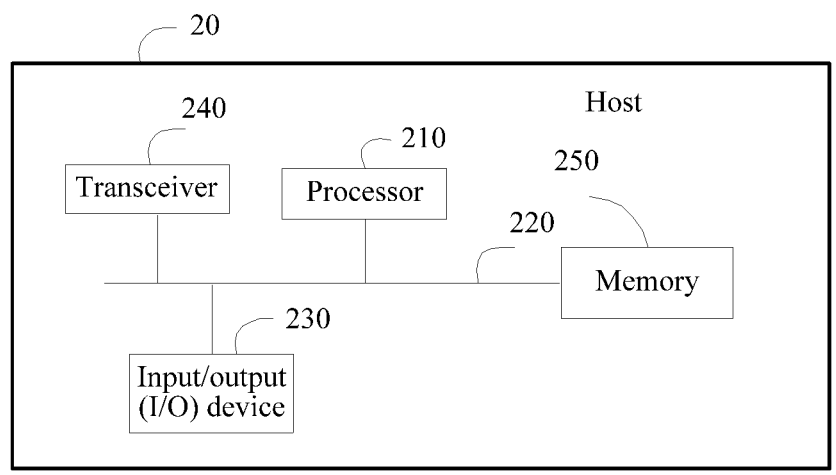
FIG. 14 is a schematic diagram of another embodiment of a host according to the embodiments of the present application.

FIG. 14 is a schematic structural diagram of a host 20 according to an embodiment of the present application. The host 20 is a source host in a data transmission system, the data transmission system further includes a router and a destination host, a transmission link among the source host, the router, and the destination host bears a plurality of streams, and a transmission priority is configured for each of the plurality of streams. The host 20 includes a processor 210. The processor 210 may be a central processing unit (CPU), a transceiver 240, a memory 250, and an input/output (I/O) device 230. The input/output (I/O) device 230 may be a keyboard or a mouse. The memory 250 may include a read-only memory and a random access memory, and provide an operation instruction and data to the processor 210. A part of the memory 250 may further include a nonvolatile random access memory (NVRAM).

In some implementations, the memory 250 stores the following elements: an executable module or a data structure, or a subset thereof, or an extended set thereof.

In this embodiment of the present application, the operation instruction (the operation instruction may be stored in an operating system) stored in the memory 250 is invoked, so that the transceiver 240 is configured to:

send a resource data packet on each stream based on a transmit rate of each stream, where when the router determines that the transmission link is congested, the router sets a congestion flag in the resource data packet; and receive, from each stream, each response data packet forwarded by the router, where the response data packet is sent by the destination host, at least one response data packet on at least one stream includes a congestion notification flag, and the congestion notification flag is used to notify the source host that the transmission link has already been congested; and the processor 210 is configured to: perform congestion processing based on the congestion notification flag and the transmission priority of each stream, and add a flag indicating that congestion has already been processed to a to-be-sent resource data packet, where the flag indicating that congestion has already been processed is used to notify the destination host that the congestion of the transmission link has already been processed.

According to the source host provided in this embodiment of the present application, congestion processing can be performed for a QUIC data packet. In this way, the congestion of the transmission link is relieved and data transmission efficiency is improved; and in addition, in this embodiment of the present application, the congestion processing is performed based on the transmission priority of the stream, thereby further ensuring data transmission on a stream with a high priority and ensuring experience of an important user.

The processor 210 controls an operation of the host 20. The memory 250 may include a read-only memory and a random access memory, and provide an instruction and data to the processor 210. A part of the memory 250 may further include a nonvolatile random access memory (NVRAM). In a specific application, components of the host 20 are coupled together by using a bus system 220. In addition to a data bus, the bus system 220 may further include a power bus, a control bus, a status signal bus, and the like. However, for clear description, various types of buses in the figure are marked as the bus system 220.

The methods disclosed in the foregoing embodiments of the present application may be applied to the processor 210, or may be implemented by the processor 210. The processor 210 may be an integrated circuit chip and has a signal processing capability. In an implementation process, the steps in the foregoing methods may be implemented by using an integrated logical circuit of hardware in the processor 210 or an instruction in a form of software in the processor 210. The foregoing processor 210 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 210 may implement or perform the methods, steps, and logical block diagrams disclosed in the embodiments of the present application. The general purpose processor may be a microprocessor or the processor may be any conventional processor or the like. The steps of the methods disclosed in the embodiments of the present application may be directly implemented by a hardware decoding processor, or may be implemented by using a combination of hardware and software modules in a decoding processor. The software module may be located in a mature storage medium in the art, such as a random access memory, a flash memory, a read-only memory, a programmable read-only memory, an electrically-erasable programmable memory, or a register. The storage medium is located in the memory 250, and the processor 210 reads information in the memory 250 and implements the steps in the foregoing methods in combination with hardware in the processor 210.

Optionally, the processor 210 is specifically configured to decrease, based on the transmission priority of each stream, a transmit rate of each stream whose transmission priority is lower than a preset threshold.

Optionally, the processor 210 is specifically configured to decrease, based on the transmission priorities of the streams, the transmit rates of the streams respectively by stepwise increasing amounts in descending order of the transmission priorities. An amount by which a rate of a stream with a high transmission priority is decreased is less than an amount by which a rate of a stream with a low transmission priority is decreased.

Optionally, the processor 210 is specifically configured to: when a quantity of received congestion notifications that are sent by the destination host does not reach a preset threshold, decrease the transmit rates of the streams in a progressive manner; or when a quantity of received congestion notifications that are sent by the destination host reaches the preset threshold, decrease the transmit rates of the streams in a stepwise manner.

Optionally, the processor 210 is specifically configured to add the flag indicating that congestion has already been processed to an idle bit in a header of the to-be-sent resource data packet.

For understanding of the host 20, refer to related descriptions in FIG. 1 to FIG. 11, and excessive details are not described herein.

Figure 15:
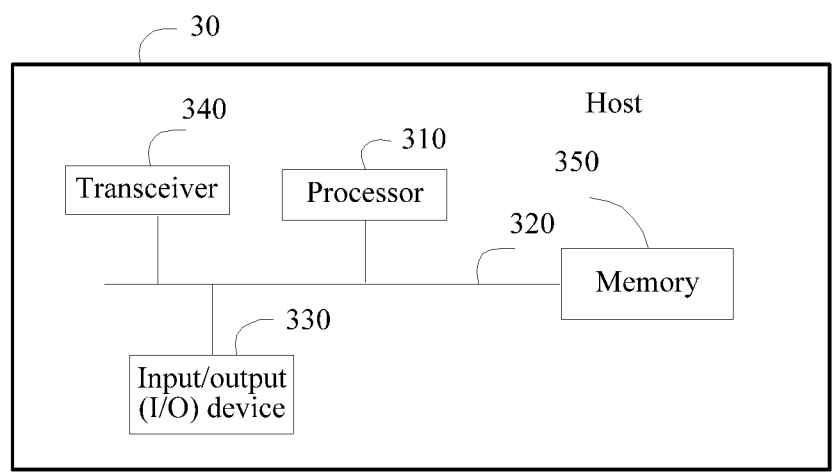
FIG. 15 is a schematic diagram of another embodiment of a host according to the embodiments of the present application.

FIG. 15 is a schematic structural diagram of a host 30 according to an embodiment of the present application. The host 30 is a destination host in a data transmission system, the data transmission system further includes a source host and a router, a transmission link among the source host, the router, and the destination host bears a plurality of streams, and a transmission priority is configured for each of the plurality of streams. The host 30 includes a processor 310. The processor 310 may be a central processing unit (CPU), a transceiver 340, a memory 350, and an input/output (I/O) device 330. The input/output (I/O) device 330 may be a keyboard or a mouse. The memory 350 may include a read-only memory and a random access memory, and provide an operation instruction and data to the processor 310. A part of the memory 350 may further include a nonvolatile random access memory (NVRAM).

In some implementations, the memory 350 stores the following elements: an executable module or a data structure, or a subset thereof, or an extended set thereof.

In this embodiment of the present application, the operation instruction (the operation instruction may be stored in an operating system) stored in the memory 350 is invoked, so that The transceiver 340 is configured to receive, from each stream, a resource data packet forwarded by the router, where the resource data packet is sent by the source host, and when the router determines that the transmission link is congested, the router sets a congestion flag in the resource data packet; and the processor 310 is configured to: set, based on the congestion flag, a congestion notification flag in at least one to-be-sent response data packet corresponding to at least one stream; send, on the at least one stream, the response data packet in which the congestion notification flag has already been set, where the congestion notification flag is used to indicate to the source host that the transmission link has already been congested; and when receiving a resource data packet including a flag indicating that congestion has already been processed, stop setting a congestion notification flag in a to-be-sent response data packet.

According to the destination host provided in this embodiment of the present application, congestion processing may be performed for a QUIC data packet. In this way, the congestion of the transmission link is relieved and data transmission efficiency is improved; and in addition, in this embodiment of the present application, the congestion processing is performed based on the transmission priority of the stream, thereby further ensuring data transmission on a stream with a high priority and ensuring experience of an important user.

The processor 310 controls an operation of the host 30. The memory 350 may include a read-only memory and a random access memory, and provide an instruction and data to the processor 310. A part of the memory 350 may further include a nonvolatile random access memory (NVRAM). In a specific application, components of the host 30 are coupled together by using a bus system 320. In addition to a data bus, the bus system 320 may further include a power bus, a control bus, a status signal bus, and the like. However, for clear description, various types of buses in the figure are marked as the bus system 320.

The methods disclosed in the foregoing embodiments of the present application may be applied to the processor 310, or may be implemented by the processor 310. The processor 310 may be an integrated circuit chip and has a signal processing capability. In an implementation process, the steps in the foregoing methods may be implemented by using an integrated logical circuit of hardware in the processor 310 or an instruction in a form of software in the processor 310. The foregoing processor 310 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 310 may implement or perform the methods, steps, and logical block diagrams disclosed in the embodiments of the present application. The general purpose processor may be a microprocessor or the processor may be any conventional processor or the like. The steps of the methods disclosed in the embodiments of the present application may be directly implemented by a hardware decoding processor, or may be implemented by using a combination of hardware and software modules in a decoding processor. The software module may be located in a mature storage medium in the art, such as a random access memory, a flash memory, a read-only memory, a programmable read-only memory, an electrically-erasable programmable memory, or a register. The storage medium is located in the memory 350, and the processor 310 reads information in the memory 350 and implements the steps in the foregoing methods in combination with hardware in the processor 310.

Optionally, the processor 310 is specifically configured to set the congestion notification flag at a congestion notification flag bit of the at least one to-be-sent response data packet corresponding to the at least one stream, where the congestion notification flag bit is an idle bit in a header of the to-be-sent response data packet; and correspondingly, the flag indicating that congestion has already been processed is located at an idle bit in a header of the resource data packet including the flag indicating that congestion has already been processed.

Optionally, the at least one to-be-sent response data packet corresponding to the at least one stream includes a congestion notification frame, and the congestion notification frame includes the congestion notification flag; and correspondingly, the flag indicating that congestion has already been processed is located at an idle bit in a header of the resource data packet including the flag indicating that congestion has already been processed; or the resource data packet including the flag indicating that congestion has already been processed includes a frame indicating that congestion has already been processed, and the frame indicating that congestion has already been processed includes the flag indicating that congestion has already been processed.

Optionally, the processor 310 is specifically configured to set the congestion notification flag in the to-be-sent response data packet corresponding to a stream whose transmission priority is the highest.

The transceiver 340 is configured to send, on the stream whose transmission priority is the highest, the response data packet in which the congestion notification flag has already been set.

For understanding of the host 30, refer to related descriptions in FIG. 1 to FIG. 11, and excessive details are not described herein.

A person of ordinary skill in the art may understand that all or some of the steps of the methods in the embodiments may be implemented by a program instructing relevant hardware. The program may be stored in a computer readable storage medium. The storage medium may include a ROM, a RAM, a magnetic disk, an optical disc, or the like.

The congestion processing method, the host, and the system provided in the embodiments of the present application are described above in detail. In this specification, specific examples are used to describe the principle and implementations of the present application, and the descriptions of the embodiments are only intended to help understand the method and core idea of the present application. Meanwhile, a person of ordinary skill in the art may make, based on the idea of the present application, modifications with respect to the specific implementations and the application scope. In conclusion, the content of this specification shall not be construed as a limitation to the present application.

What is claimed is:

1. A congestion processing method, wherein the method relates to a data transmission system comprising and the method comprises:
   sending, by the source host, a resource data packet on each stream in a plurality of streams based on a transmit rate of each stream, wherein:
      a transmission link among the source host, the router, and the destination host bears the plurality of streams;
      a transmission priority is configured for each of the plurality of streams; and
      when the router determines that the transmission link is congested, the router sets a congestion flag in the resource data packet;
   receiving, by the source host from each stream, a response data packet forwarded by the router, wherein:
      the response data packet is sent by the destination host;
      at least one response data packet on at least one stream comprises a congestion notification flag; and
      the congestion notification flag is used to notify the source host that the transmission link has already been congested;
   performing, by the source host, congestion processing based on the congestion notification flag and the transmission priority of each stream; wherein performing congestion processing based on the transmission priority of each stream comprises:
      decreasing, based on the transmission priorities of the streams, the transmit rates of the streams respectively by stepwise increasing amounts in descending order of the transmission priorities, wherein an amount by which a rate of a stream with a high transmission priority is decreased is less than an amount by which a rate of a stream with a low transmission priority is decreased; and
   adding, by the source host, a flag indicating that congestion has already been processed to a to-be-sent resource data packet, wherein the flag indicating that congestion has already been processed is used to notify the destination host that the congestion of the transmission link has already been processed.

2. The method according to claim 1, wherein the performing congestion processing based on the transmission priority of each stream comprises:
   decreasing, based on the transmission priority of each stream, a transmit rate of each stream whose transmission priority is lower than a preset threshold.

3. The method according to claim 1, wherein the performing congestion processing based on the transmission priority of each stream comprises:
   when a quantity of received congestion notifications that are sent by the destination host does not reach a preset threshold, decreasing the transmit rates of the streams in a progressive manner.

4. The method according to claim 1, wherein the adding, by the source host, a flag indicating that congestion has already been processed to a to-be-sent resource data packet comprises:
   adding, by the source host, the flag indicating that congestion has already been processed to an idle bit in a header of the to-be-sent resource data packet.

5. The method according to claim 1, wherein the performing congestion processing based on the transmission priority of each stream comprises:
   when a quantity of received congestion notifications that are sent by the destination host reaches the preset threshold, decreasing the transmit rates of the streams in a stepwise manner.

6. A host, wherein the host is a source host in a data transmission system, the data transmission system further comprising a router and a destination host, and the host comprises:
   a transceiver, wherein the transceiver is configured to:
      send a resource data packet on each stream in a plurality of streams based on a transmit rate of each stream, wherein:
         a transmission link between the source host, the router, and the destination host bears the plurality of streams;
         a transmission priority is configured for each of the plurality of streams; and
         when the router determines that the transmission link is congested, the router sets a congestion flag in the resource data packet;
      receive, from each stream in the plurality of streams, each response data packet forwarded by the router, wherein:
         the response data packet is sent by the destination host;
         at least one response data packet on at least one stream comprises a congestion notification flag; and
         the congestion notification flag is used to notify the source host that the transmission link has already been congested; and
   a processor, wherein the processor is configured to:
      perform congestion processing based on the congestion notification flag received by the transceiver and the transmission priority of each stream;
      decrease, based on the transmission priorities of the streams, the transmit rates of the streams respectively by stepwise increasing amounts in descending order of the transmission priorities, wherein an amount by which a rate of a stream with a high transmission priority is decreased is less than an amount by which a rate of a stream with a low transmission priority is decreased; and
      add a flag indicating that congestion has already been processed to a to-be-sent resource data packet, wherein the flag indicating that congestion has already been processed is used to notify the destination host that the congestion of the transmission link has already been processed.

7. The host according to claim 6, wherein the processor is further configured to decrease, based on the transmission priority of each stream, a transmit rate of each stream whose transmission priority is lower than a preset threshold.

8. The host according to claim 6, wherein the processor is further configured to when a quantity of received congestion notifications that are sent by the destination host does not reach a preset threshold, decrease the transmit rates of the streams in a progressive manner.

9. The host according to claim 6, wherein the processor is further configured to add the flag indicating that congestion has already been processed to an idle bit in a header of the to-be-sent resource data packet.

10. The host according to claim 6, wherein the processor is further configured to:
   when a quantity of received congestion notifications that are sent by the destination host reaches the preset threshold, decrease the transmit rates of the streams in a stepwise manner.

11. A host, wherein the host is a destination host in a data transmission system, the data transmission system further comprises a source host and a router, and the destination host comprises:
   a transceiver, wherein the transceiver is configured to:
      receive, from each stream in a plurality of streams, a resource data packet forwarded by the router, wherein:
         a transmission link between the source host, the router, and the destination host bears the plurality of streams;
         a transmission priority is configured for each of the plurality of streams;
         the resource data packet is sent by the source host; and
         when the router determines that the transmission link is congested, the router sets a congestion flag in the resource data packet;
   a processor, wherein the processor is configured to:
      set, based on the congestion flag received by the transceiver, a congestion notification flag in at least one to-be-sent response data packet corresponding to at least one stream; and
   wherein:
      the transceiver is further configured to send, on the at least one stream, the response data packet in which the congestion notification flag has already been set by the processor, wherein the congestion notification flag is used to indicate to the source host that the transmission link has already been congested; and
      the processor is configured to when the transceiver receives a resource data packet comprising a flag indicating that congestion has already been processed;
   wherein the processor is further configured to set the congestion notification flag in the to-be-sent response data packet corresponding to a stream whose transmission priority is the highest; and the transceiver is configured to send, on the stream whose transmission priority is the highest, the response data packet in which the congestion notification flag has already been set;
   stop setting a congestion notification flag in a to-be-sent response data packet.

12. The host according to claim 11, wherein the processor is further configured to:
   set the congestion notification flag at a congestion notification flag bit of the at least one to-be-sent response data packet corresponding to the at least one stream, wherein the congestion notification flag bit is an idle bit in a header of the to-be-sent response data packet; and
   the flag indicating that congestion has already been processed is located at an idle bit in a header of the resource data packet comprising the flag indicating that congestion has already been processed.

13. The host according to claim 11, wherein:
   the at least one to-be-sent response data packet corresponding to the at least one stream comprises a congestion notification frame, and the congestion notification frame comprises the congestion notification flag; and
   the flag indicating that congestion has already been processed is located at an idle bit in a header of the resource data packet comprising the flag indicating that congestion has already been processed.

14. The host according to claim 11, wherein:
   the at least one to-be-sent response data packet corresponding to the at least one stream comprises a congestion notification frame, and the congestion notification frame comprises the congestion notification flag; and
   the resource data packet comprising the flag indicating that congestion has already been processed comprises a frame indicating that congestion has already been processed, and the frame indicating that congestion has already been processed comprises the flag indicating that congestion has already been processed.

* * * * *